United States Patent [19]

May, Jr.

[11] 4,275,025

[45] Jun. 23, 1981

[54] REFRACTORY METAL DIBORIDE ARTICLES BY COLD PRESSING AND SINTERING

[75] Inventor: Russell R. May, Jr., Wadsworth, Ohio

[73] Assignee: PPG Industries, Inc., Pittsburgh, Pa.

[21] Appl. No.: 894,972

[22] Filed: Apr. 10, 1978

Related U.S. Application Data

[63] Continuation-in-part of Ser. No. 792,640, May 2, 1977, abandoned.

[51] Int. Cl.³ .............................................. C04B 35/58
[52] U.S. Cl. ...................................... 264/63; 106/73.3; 264/65
[58] Field of Search ................... 264/65, 325, 332, 63; 423/289; 106/73.3

[56] References Cited

U.S. PATENT DOCUMENTS

| | | |
|---|---|---|
| 2,982,533 | 5/1961 | Meyer et al. . |
| 3,003,885 | 10/1961 | Mandorf .............................. 106/73.3 |
| 3,011,927 | 12/1961 | Zelezny . |
| 3,202,600 | 8/1965 | Ransley . |
| 3,215,545 | 11/1965 | Reidl et al. .......................... 106/73.3 |
| 3,411,959 | 11/1968 | Corth . |
| 3,467,745 | 9/1969 | Lambertson ........................ 264/332 |
| 3,472,709 | 10/1969 | Quatinitz . |
| 3,586,303 | 6/1971 | Lee . |
| 3,589,694 | 6/1971 | Gelling . |
| 3,979,500 | 9/1976 | Sheppard et al. . |
| 4,097,567 | 6/1978 | Cebulak .............................. 106/73.3 |

FOREIGN PATENT DOCUMENTS

| | | | |
|---|---|---|---|
| 1010492 | 11/1965 | United Kingdom .................... | 264/332 |
| 2523423 | 5/1976 | Fed. Rep. of Germany ........... | 264/332 |

*Primary Examiner*—John Parrish
*Attorney, Agent, or Firm*—Irwin M. Stein

[57] ABSTRACT

A method of making articles of Group IVb metal diboride powder by cold pressing and sintering is disclosed. Group IVb metal diboride powder is pressed in a mold substantially below sintering temperatures to form a cold pressed green piece having substantially uniform compaction over its major surfaces. The piece is enclosed but not confined in a thermally conductive receptacle which has been pre-fired to remove volatile impurities, and the enclosed piece sintered without the simultaneous application of pressure. The powder and green piece are maintained under inert atmosphere before and during sintering. The method is particularly useful for the production of flat plates, where warpage during sintering may otherwise be a problem.

14 Claims, No Drawings

REFRACTORY METAL DIBORIDE ARTICLES BY COLD PRESSING AND SINTERING

CROSS REFERENCE TO RELATED APPLICATIONS

This application is a continuation-in-part application of my copending application Ser. No. 792,640, filed May 2, 1977 now abandoned.

DESCRIPTION OF THE INVENTION

Group IVb metal diboride articles, e.g., titanium diboride articles, have known utility as cathodes in electrolytic aluminum reduction cells. Articles for use in such cells are desirably made to close tolerances, and should be of near theoretical density in order to resist corrosion in the cell. Heretofore, Group IVb metal diboride articles of near theoretical density have been produced by the technique of hot pressing, in which powder is consolidated by sintering while being pressed simultaneously in a mold at high pressures, e.g., 0.5 to 50 tons per square inch.

It has been disclosed in German Offenlegungsschrift No. 25 23 423, that Group IVb metal, i.e., titanium, zirconium and hafnium, diboride powders, particularly submicron carbon-containing Group IVb metal diboride powders, can be cold pressed and sintered to near theoretical density, i.e., to at least 90 percent of the theoretical density of the metal diboride. In this technique, metal diboride powder is first pressed in a mold below sintering temperatures, e.g., at room temperature or slightly above, to form a shaped green compact, which is then removed from the mold and sintered.

Owing to the kind of equipment used, articles of more complex shape can be produced more easily and economically by cold pressing and sintering than by hot pressing. However, because in the cold pressing and sintering technique, the article is not confined in its mold under pressure during sintering, the fabrication of articles to close tolerances, e.g., without warpage, can be more difficult.

In accordance with the present invention, a highly useful procedure has been developed for the fabrication of Group IVb metal diboride articles by the cold pressing and sintering of the above mentioned Group IVb metal diboride powders. The procedure is particularly useful for the preparation of substantially flat plates, in which warpage can otherwise be a problem, but can be used to produce a variety of other shapes.

The present invention resides in the discovery of the combined steps of:

(1) placing in a suitable mold, i.e., one designed to yield the desired shape, refractory Group IVb metal diboride powder having distributed thereon between about 0.5 and 5 weight percent of hydrocarbon binder, (2) cold pressing uniformly said powder in said mold to between about 40 and 65 percent of the theoretical density of the Group IVb metal diboride to form a cold pressed piece, (3) enclosing, but not confining the cold pressed piece in a thermally conductive receptacle from which volatile impurities have been removed, e.g., by pre-firing the receptacle at the sintering temperature, (4) sintering the enclosed cold pressed piece without the simultaneous application of pressure to form a sintered article, (5) recovering a sintered Group IVb metal diboride article having a density of at least about 90 percent of the theoretical density of the Group IVb metal diboride, and (6) maintaining the Group IVb metal diboride under an inert atmosphere during steps (1) through (4).

DETAILED DESCRIPTION OF THE INVENTION

In the practice of this invention, any type of mold known in the art of cold pressure molding of powders can be used to produce the shaped molded article. The mold should provide for the application of substantially uniform pressure to at least the major surfaces of the article being formed to produce a green piece in which the powder has been compacted uniformly. Such molds include metal or graphite molds in which typically at least one punch or plunger is forced into a powder-filled cavity to compact the powder, and flexible molds, such as rubber molds, which are filled with powder and pressed isostatically while immersed in a liquid such as water.

Metal or graphite molds can be used to press a variety of shapes, simple and complex, and are especially useful for making flat articles such as round or rectangular plates. In such molds, a cavity is defined by parallel, opposed upper and lower flat punches that are fitted closely but moveably into an aperture in a peripheral die, much as a piston is fitted in a cylinder. The shape of the aperture, e.g., round, hexagonal, or rectangular, determines the shape of the piece pressed in it, and its depth determines the maximum thickness of the pressed piece. In use, one punch is inserted part way into the aperture to form a flat-bottomed cavity in which is placed a uniformly thick layer of the powder to be pressed. The second punch is placed on top of the powder, so that the powder is sandwiched between the flat, parallel, opposed punches and retained by the side walls of the aperture. The punches are then moved toward each other, compacting the powder between them. It is important that both punches are able to move with respect to the side walls of the aperture, because if only one punch moves, the powder will be more highly compacted at the surface of the pressed plate adjacent the moving punch than at the opposite surface, resulting in warpage upon sintering. The punches and the die may be separate elements or they may be portions of a larger apparatus, such as a hydraulic press. Other mold arrangements or cold pressing techniques that provide substantially equal compaction at both faces of the cold pressed article can also be used. The punches are preferably of a material to which the pressed Group IVb metal diboride piece has little tendency to stick. Examples of such materials are graphite, smooth steel or coated aluminum.

Flexible, e.g., rubber, molds are useful in making more complex shapes such as spheres, rods, bars, solid and hollow cylinders, etc. These molds are water tight and shaped to provide a pressed piece of the desired dimensions. They are filled with powder to be pressed, sealed, and pressed isostatically, that is, while immersed in a liquid such as water. When pressure is applied to the liquid in a sealed container, the pressure is transmitted equally in all directions; thus the pressure on the surfaces of the flexible mold in contact with the fluid is equal at all points providing very uniform compaction of the powder within.

In filling a mold, regardless of type, care is taken to fill the mold uniformly, so that the bulk density of the powder is substantially uniform throughout the mold. The powder may be poured or sifted into the mold, with slight tapping to aid in settling and the elimination of air pockets. However, excessive vibration may cause the particles of the powder to become segregated by size, resulting in nonuniform powder density in the mold. Furthermore, mechanical tamping may result in uneven density. The bulk density of the powder in the mold before pressing is desirably between about ½ and ¼ of the pressed bulk density in order to obtain uniform compaction. The mold, of course, must be big enough to contain the powder in its unpressed state.

The powder is "cold pressed", that is, it is pressed in the mold at substantially below the sintering temperature, for example, at room temperature or slightly above to form a cold pressed piece. Cold pressing is a technique well known in the art. Pressures of from about 0.5 to 50 tons per square inch, e.g., about 1 to 10 tons per square inch, are useful. It is preferable to use sufficient pressure to compact the powder to between about 40 and 65 percent, e.g., about 50 percent, of the theoretical density of the Group IVb metal diboride so that, the green piece can be handled without breaking and, upon sintering, a sintered article of near theoretical density, i.e., at least about 90, e.g., 95 or 98, percent of theoretical density, is obtained.

The pressure may be applied to the mold by any conventional means, including mechanical presses, hydraulic presses, and isostatic presses. The chief requirement is that substantially equal compaction of powder is achieved. By "substantially equal compaction" is meant that the density of the powder at the surface in which pressure was applied is substantially uniform at all points on the surface. It is, however, contemplated that the density of the surface will be greater than the density of the interior of the cold pressed piece, owing to friction in the powder that limits compaction in the interior. Such a density gradient from the surface to the interior of a cold pressed piece is normal and acceptable. It is difficult to achieve uniform compaction of relatively minor surfaces such as the edges of flat plates or the ends of rods, etc., but this is not necessary if the major surfaces of the piece are uniformly compacted. Uniform compaction is critical in the preparation of substantially flat plates free of excessive warpage. Compaction must be as uniform as possible across the faces of the cold pressed plate.

By "flat plate" is meant an article having two broad parallel, opposite planar faces and a thickness substantially smaller than the length and the width of the faces. The faces of the plates can be any of polygonal shape, such as square, rectangular, triangular, hexagonal, trapezoidal, round, oval, and elliptical, and of any size, of course the dimensions of the plate will be limited by the equipment, e.g., molds, etc. available to handle and sinter the green piece. The thickness can vary widely, depending upon the size of the plate, but is generally at least 1 millimeter, usually between about 5 and 50 millimeters. A "substantially flat plate" as the term is used herein is one that deviates from flatness by no more than 2 millimeters in 150 millimeters as measured by holding a straightedge against a face of the plate and observing any gap between the straightedge and the plate.

In accordance with this invention, the cold pressed piece is enclosed in a thermally conductive receptacle while it is sintered. Usually, the pressed piece is strong enough to withstand gentle handling without breakage. Once removed from the mold, the cold pressed piece is enclosed but not confined in the receptacle, which may but need not be in contact with the piece. Preferably, the piece is placed in a closed solid box-type receptacle so that the green piece is fully enclosed. The box may be equipped with one or more shelves for holding a number of pressed pieces. The shelves desirably are machined flat and smooth so that plates resting on them during sintering take on a flat, smooth finish. Flat plates may also be sandwiched between sheets of thermally conductive material instead of being placed in a box, and even though the edges of the plates are exposed, they are "enclosed" in a receptacle as the term is used herein in the specification and the claims.

Material from which the receptacle is fabricated must be thermally conductive, i.e., it must conduct uniformly the heat produced by the sintering furnace to the green piece to be sintered. It has been observed that when flat green pieces of titanium diboride are sintered in a vacuum furnace without being enclosed in a thermally conductive material, warping of the piece occurs. This warping is due, it is believed, by the non-uniform, i.e., uneven, heating, and consequently different sintering rate, which occurs at different surfaces of the green piece. However, by enclosing the green piece in a thermally conductive material, i.e., receptacle, the heat from the furnace is distributed uniformly to the green piece, which results in substantially uniform sintering of the piece and little warpage.

The thermally conductive receptacle must be chemically inert to the cold pressed piece, i.e., there must not be the possibility of an objectionable chemical reaction occuring between the receptacle and the metal diboride green piece during the sintering operation, which includes the heat up and cool down steps. Further, the receptacle should have a low vapor pressure at the conditions of sintering, i.e., it must be stable at such conditions and not melt or decompose. Since sintering of the borides occurs at temperatures of between about 1800° C. and 2500° C., the materials used for the receptacle are limited to refractory compounds and metals. The requirement of chemical inertness limits further materials useful as the receptacle.

As indicated the receptacle can be in the form of a box or container, or sheets. Thus, graphite felt sheets can be used to surround the green piece. The receptacle can also be in the form of powder in which the green piece is buried. Preferably, the receptacle is a solid in the form of a box or sheet.

Particularly useful as the thermally conductive receptacle are carbon, graphite, Group IVb metal carbides and borides. Graphite is preferred economically. Also useful are refractory metals such as tantalum and tungsten. However, the metals are more susceptible to oxidation and carburization at the sintering temperatures.

The receptacle used to enclose the cold pressed piece should have volatile impurities that may be contained therein, such as sulfur, adsorbed moisture, and adsorbed oxygen removed. This can be readily accomplished by pre-heating the receptacle. Graphite to be used for the first time is pre-fired with special care because the virgin graphite frequently contains substantial amounts of sulfur. Even used graphite adsorbs moisture and oxygen from the air. Pre-firing is done at temperatures approaching or, preferably, exceeding the sintering temperature to be used, i.e., temperatures in the range of 1800° to 2500° C., for at least about 1 hour. For example, graphite plates or a graphite box can be fired at 2200° C. for 1 hour when sintering is to be done at 2100°

C. Pre-firing of the receptacle, e.g., graphite enclosure, reduces warpage and prevents tarnishing of the pressed pieces during sintering, so that sintered articles having a bright metallic luster are obtained. The pre-fired enclosure is cooled and kept under an inert atmosphere, such as argon, until needed.

The receptacle surrounds the green piece during sintering to provide substantially uniform heating and thus substantially uniform sintering of the piece. However, the receptacle does not confine the green piece during sintering, i.e., there is no application of pressure simultaneously to the piece during sintering. Movement of the green piece is not restricted during sintering and it is free to expand or shrink during sintering in all directions. Group IVb metal diborides will shrink during sintering and by not confining the piece during sintering artificially induced stresses resulting from such a confinement are not imposed on the piece.

Sintering of the enclosed green metal diboride piece is performed at 1800° to 2500° C., typically 2000° to 2250° C., for between about ½ hour and 8 hours, e.g., at 2100° C.–2200° C. for 1 hour. Sintering is done in a furnace under inert conditions, such as under atmospheres of nitrogen, helium, argon, or vacuum. Preferably, the furnace is flushed with inert gas and then evacuated when vacuum sintering is used. After sintering, the article is cooled and removed from the furnace and the receptacle.

Throughout the practice of the above described steps, the Group IVb metal diboride powder, the pressed piece, and the hot sintered article are maintained under inert conditions, e.g., an atmosphere of argon, helium or vacuum, because the diboride in those forms is sensitive to moisture and oxygen, i.e., it tends to react with them. After sintering, the cooled sintered article can be exposed to the atmosphere.

Refractory metal diboride powders that can be cold pressed and sintered in accordance with the present invention are finely divided, preferably submicron, Group IVb metal diboride powders, namely titanium, zirconium, and hafnium diboride powders. Such Group IVb metals are so identified in the Periodic Table of the Elements in the Handbook of Chemistry and Physics, 45th edition, published by Chemical Rubber Co., 1964. Particularly useful are those powders that have an oxygen content below about 0.25 percent by weight of metal diboride and/or a total carbon content from above about 0.1 to about 5 percent by weight. The oxygen content is an impurity present typically as absorbed elemental oxygen or combined as oxides of boron, the Group IVb metal or metal impurities. Metal impurities typically amount to less than 4000 parts per million parts of the boride powder (p.p.m.), i.e., less than 0.4 weight percent. The carbon, which can be present as elemental carbon, combined carbon, or both, functions as a densifying aid.

The carbon can be introduced by physically blending finely divided carbon or submicron metal carbide powder, e.g., titanium, zirconium, hafnium, or boron carbide powder, with metal diboride powder. Preferably, carbon-containing submicron Group IVb metal diboride powders are prepared directly by vapor phase reaction of the corresponding metal halide, e.g., titanium halide, vaporous carbon source, e.g., halogenated hydrocarbon, and boron source reactant, e.g., boron trichloride, in a reaction zone in the substantial absence of oxygen, either combined or elemental, as described in the aforementioned Offenlegungsschrift No. 25 23 423, the entire disclosures of which are incorporated herein by reference. Briefly, that publication describes a process wherein the metal halide carbon source, and boron source reactants are mixed with a hot stream of hydrogen produced by heating hydrogen in an arc heater. The reaction zone is maintained at metal boride forming temperatures of from 1000° C. to 2700° C. depending on the metal, and submicron solid, carbon-containing metal boride powder is removed promptly from the reactor and permitted to cool. The vapor phase preparation of titanium boride is also described in Examples VI–VIII of U.S. Pat. No. 3,979,500, the disclosure of which is incorporated herein by reference insofar as it relates to the preparation of submicron titanium diboride.

When titanium diboride powder is produced in accordance with the above referenced disclosures, the particles thereof are well developed individual crystals having well developed faces. Substantially all, i.e., at least 90 percent, of the particles have a nominal sectional diameter of less than 1 micron. The preponderant number, i.e., greater than 50 percent, of the particles less than 1 micron are in the particle size range of between 0.05 and 0.7 microns. The number median particle size of the boride particles is usually between about 0.08 and about 0.6 microns. The B.E.T. surface area of the boride powder varies from about 3 to about 35 square meters per gram ($m^2$/gram), more typically between about 4 and about 15 $m^2$/gram.

The carbon-containing metal diboride powder can be coated with a hydrocarbon binder, such as a paraffin or polyethylene wax, in order to increase the bulk density of the powder and to increase the strength of the green compact. Desirably, the powder is coated with hydrocarbon binder and agglomerated to a controlled bulk density. Powders so coated are free-flowing and pour readily into molds. Controlled bulk density makes it possible to fill molds consistently by volume of powder. Conventional wax coating techniques such as spray drying or milling in the presence of molten wax can be used.

U.S. Pat. No. 3,202,600 describes titanium diboride cathodes of various shapes, such as rectangular plates, bars, and cylindrical rods, for use in electrolytic aluminum reduction cells. Group IVb metal diboride articles of these and other shapes can be fabricated in accordance with the present invention. As indicated earlier, flat plates of various polygonal shapes can be so prepared. Further, other shapes such as plates with holes, e.g., a grate, solid cylinders, such as rods of various lengths, e.g., from studs to pole or rod-like elements, hollow cylinders, open or closed at one or both ends, and other geometric shapes, e.g., spheres, cups, etc. can be so prepared. The present invention provides a method for maintaining the geometry of such shapes during sintering.

The following examples will serve to illustrate the practice of this invention. Although these examples describe the fabrication of flat rectangular plates by mechanical pressing between flat punches, the procedure can be adapted easily by one skilled in the art for making other shapes by mechanical or isostatic pressing.

EXAMPLE

A number of 4 inch by 6 inch by ¼ titanium diboride plates were made from three different batches of powder in accordance with the procedure described below. The titanium diboride powder was made by vapor phase reaction of titanium tetrachloride, boron trichloride, and halogenated hydrocarbon in a heated hydrogen stream as described in Offenlegungsschrift No. 25 23 423. The properties of the powder samples appear in Tabke I. Surface area, percent boron, and percent carbon were measured for the raw powder. Bulk density and percent oxygen were measured after the powder had been coated with 2 weight percent of a paraffin wax melting at 120° F. Percents are by weight of $TiB_2$.

TABLE I

| | | TITANIUM DIBORIDE POWDERS | | | | |
|---|---|---|---|---|---|---|
| Powder No. | Surface Area, $m^2/g$ | Poured Bulk Density, lb/ft | Boron, % | Oxygen, % | Free Carbon, % | Total Carbon % |
| 1 | 7.9 | 63.0 | 31.5 | 0.13 | 0.33 | 0.73 |
| 2 | 7.7 | 68.5 | 31.1 | 0.09 | 0.38 | 0.70 |
| 3 | 9.1 | 62.0 | 31.5 | 0.12 | 0.16 | 0.70 |

The mold assembly used to make the plates included an outer steel die and two graphite punches. The outer steel die was 1 inch thick, had a rectangular aperture 4.760 inches by 7.170 inches with rounded corners of ⅛ inch radius, and had ¾ inch wide sides around the aperture. To ease removal of the pressed plate and the punches, the aperture was beveled 10° at the lower ¼ inch and 5° at the upper 7/16 inch, with a 5/16 inch straight portion between. The upper and lower punches, machined from Union Carbide CS Grade graphite, were 4.750 by 7.160 by 0.750 inches with a ⅛ inch radius at the corners, allowing 0.005 inch clearance between the punches and the die on all four sides.

Shims were used to support the outer steel die above the lower punch so that the lower punch and the die defined a cavity of the desired thickness calculated to contain a desired weight of powder known bulk density. The powder was sifted into the cavity with a kitchen flour sifter and carefully leveled with the top of the die with a straightedge. The upper punch was then gently laid atop the powder and aligned with the die aperture. The assembly rested on a steel plate so that it could be moved without disturbing its alignment. The mold was filled in an argon-filled glove box and heat-sealed in plastic film before removal to the press.

The filled mold still on its support plate and sealed in plastic was placed between the platens of a hydraulic press. Because the shims supporting the outer steel die prevented the lower punch from moving further into the die, the powder nearest the lower punch was under-compacted upon pressing, leading to warpage of the plate upon sintering. Therefore, a modified pressing procedure was adopted which simulates the results obtainable with double action presses in which both punches move simultaneously. In accordance with this pressing procedure, the assembled, filled mold is pressed at a low pressure that causes the upper punch to compact the powder enough to hold the outer die in place when the supporting shims are removed. The pressure is then released and the shims are slid carefully away from the mold, leaving the outer die suspended, held in place only by the friction of the compacted powder within the mold. Then, the mold is pressed at the full pressure desired for forming the green compact. Both punches are now free to move with respect to the die, so that substantially uniform compaction of the powder is achieved. Accordingly, in pressing the plates of this example, the mold was first pressed at about 5000 pounds total, or about 145 pounds per square inch, the shims were removed, and the mold was pressed again at about 50 tons or 2940 pounds per square inch. The pressed compact was then removed from the mold under argon, its upper edges were trimmed of any adhering flashing with a knife, and it was placed in an argon-filled graphite sintering box on a flat, smooth graphite support.

The sintering boxes were constructed of Union Carbide CS Grade graphite, measuring 7⅜ inches wide, 5⅛ inches deep, 5 1/16 inches high inside. Each had two removable shelves and a closure held in place by graphite pins. Before use, the boxes were fired at 2200° C. for 1 hour in the vacuum furnace used for sintering. Ordinarily, three plates at a time were sintered in each box.

The argon-filled boxes containing the pressed compacts were placed on ¼ inch thick graphite felt on the hearth of the sintering furnace. The sintering furnace was heated by means of graphite resistance elements at the sides. Except when it was opened for loading and unloading, the furnace was kept filled with argon or, during sintering, under vacuum of about 20 micrometers of mercury. After the boxes were loaded into the furnace, vacuum was pulled and the sintering cycle was begun.

Typically, the temperature was raised gradually to 2100° C. over a period of about 7½ hours, held at the sintering temperature of 2100° C. for 1 hour, and lowered to about 900° C. over a period of 4 hours. At that point, the furnace was refilled with argon and allowed to cool. When the boxes were cool enough to handle, they were removed from the furnace and the now sintered plates were removed from the boxes.

The sintered plates were much less sensitive to air and moisture than the powder and the green compact, and may be exposed to the air. They were smooth, substantially flat as defined hereinabove, and had a light silvery gray metallic luster. They ranged in length from 5.80 to 6.00 inches, in width from 3.83 to 3.99 inches, and in thickness from 0.24 to 0.27 inch. The density ranged from 98.7 to 99.3 percent of theoretical, taken for $TiB_2$ as 4.50 grams per cubic centimeter. Density was measured by immersion in heptane.

X-ray inspection of the plates revealed only small, scattered pores ranging from 0.025 to 0.105 inches, typically about 0.050 inches.

Of 72 plates, which were made according to the procedure described above, 58 plates were free of significant defects and fell within the ranges of 5.93 to 5.99 inches in length, 3.93 to 3.99 inches in width, 0.24 to 0.27 inch in thickness, and 99.0 to 99.3 percent of theoretical density. Three plates were cracked or broken and on two plates edges were broken, when the green pressed plates were removed from the mold. Two sintered plates had unacceptable defects revealed by X-ray inspection, one had a surface blister, and four were slightly undersize (but within the broader ranges mentioned above). Thus, titanium diboride articles of consistent size, shape, and density can be made in accordance with the procedure herein disclosed. Articles of zirconium and hafnium diborides and of mixtures of titanium, zirconium, and hafnium diborides can be made by following the procedure of this invention. Furthermore, articles of varied shapes, such as bars and cylindrical rods, can also be made.

Although this invention has been described and illustrated with specific details and embodiments, the specifics are not intended to limit the invention, the scope of which is defined by the following claims.

I claim:

1. A method of preparing a substantially flat plate of refractory Group IVb metal diboride powder by cold pressing and sintering, which comprises:
   (1) placing refractory Group IVb metal diboride powder in a mold designed to yield the desired shape, said powder having distributed thereon between about 0.5 and 5 weight percent of hydrocarbon binder,
   (2) cold pressing said powder in said mold to form a cold pressed flat plate of between about 40 and 65 percent of the theoretical density of the Group IVb metal diboride,
   (3) enclosing the cold pressed flat plate in a thermally conductive solid receptacle from which volatile impurities have been removed, said receptacle being chemically inert to the cold pressed flat plate and stable under sintering conditions, said cold pressed flat plate being unconfined by the receptacle,
   (4) heating the enclosed cold pressed flat plate substantially uniformly to the sintering temperature of the metal diboride powder without the simultaneous application of pressure to form a sintered metal diboride substantially flat plate having a density of at least about 90 percent of the theoretical density of the metal diboride, and
   (5) maintaining the Group IVb metal diboride powder and cold pressed flat plate under an inert atmosphere during steps (1) through (4).

2. The method of claim 1 wherein the thermally conductive receptacle is a carbon, graphite, Group IVb metal diboride or Group IVb metal carbide receptacle.

3. The method of claims 1 or 2 wherein the Group IVb metal diboride powder has an oxygen content of less than 0.25 weight percent, based on the metal diboride powder.

4. The method of claims 1 or 2 wherein the Group IVb metal diboride powder has a total carbon content of from above 0.1 to about 5 weight percent, based on the metal diboride powder.

5. The method of claims 1 or 2, wherein the metal diboride powder is titanium diboride having a surface area of between about 4 and 15 m²/g., wherein the nominal sectional diameter of at least 90 percent of the titanium diboride particles is less than 1 micron, said particles being tabular to equidimensional hexagonal crystals having well developed faces, the preponderant number of said particles less than 1 micron having a nominal sectional diameter of between about 0.05 and 0.7 microns.

6. The method of claims 1 or 2, wherein the powder is pressed mechanically between punches.

7. The method of claim 6, wherein the punches are graphite.

8. The method of claims 1 or 2, wherein the powder is pressed isostatically.

9. A method of preparing a substantially flat plate of refractory Group IVb metal diboride powder by cold pressing and sintering, which comprises:
   (1) placing refractory Group IVb metal diboride powder in a mold designed to yield the desired shape, said powder having distributed thereon between 0.5 and 5 weight percent of hydrocarbon binder,
   (2) cold pressing said powder in said mold to form a cold pressed flat plate of between about 40 and 65 percent of the theoretical density of the Group IVb metal diboride,
   (3) enclosing the cold pressed flat plate in a solid graphite receptacle from which volatile impurities have been removed, said cold pressed flat plate being unconfined by the receptacle,
   (4) sintering substantially uniformly the graphite-enclosed cold pressed flat plate without the simultaneous application of pressure to form a sintered metal diboride substantially flat plate having a density of at least about 90 percent of the theoretical density of the metal diboride, and
   (5) maintaining the Group IVb metal diboride powder and cold pressed flat plate under an inert atmosphere during steps (1) through (4).

10. The method of claim 9 wherein the powder is pressed between smooth, flat graphite punches.

11. The method of claim 9 wherein the powder is pressed isostatically.

12. The method of claim 9 wherein the cold pressed flat plate rests in a smooth, flat graphite support within the graphite enclosure during sintering.

13. The method of claim 9 wherein the metal diboride powder has an oxygen content of less than 0.25 weight percent and a total carbon content of from above 0.1 to about 5 weight percent, based on the metal diboride powder.

14. The method of claim 13, wherein the metal diboride powder is titanium diboride powder having a surface area of between about 4 and 15 m²/g., wherein the nominal sectional diameter of at least 90 percent of the titanium diboride particles is less than 1 micron, said particles being tabular to equidimensional hexagonal crystals having well developed faces, the preponderant number of said particles less than 1 micron having a nominal sectional diameter of between about 0.05 and 0.7 microns.

* * * * *